United States Patent
Stjernman et al.

(10) Patent No.: US 10,581,501 B2
(45) Date of Patent: Mar. 3, 2020

(54) FLEXIBLE ANALOG ARCHITECTURE FOR SECTORIZATION

(71) Applicant: Telefonaktiebolaget LM Ericsson (publ), Stockholm (SE)

(72) Inventors: Anders Stjernman, Lindome (SE); Andreas Nilsson, Göteborg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/309,581

(22) PCT Filed: Jun. 16, 2016

(86) PCT No.: PCT/EP2016/063912
§ 371 (c)(1),
(2) Date: Dec. 13, 2018

(87) PCT Pub. No.: WO2017/215755
PCT Pub. Date: Dec. 21, 2017

(65) Prior Publication Data
US 2019/0190575 A1    Jun. 20, 2019

(51) Int. Cl.
| | | |
|---|---|---|
| H04B 7/04 | (2017.01) |
| H04B 7/0491 | (2017.01) |
| H01Q 1/24 | (2006.01) |
| H01Q 3/30 | (2006.01) |
| H04B 7/10 | (2017.01) |
| H01Q 21/00 | (2006.01) |
| H01Q 21/26 | (2006.01) |

(Continued)

(52) U.S. Cl.
CPC .......... *H04B 7/0491* (2013.01); *H01Q 1/246* (2013.01); *H01Q 3/30* (2013.01); *H01Q 21/0006* (2013.01); *H01Q 21/26* (2013.01); *H04B 7/0617* (2013.01); *H04B 7/10* (2013.01); *H01Q 25/001* (2013.01)

(58) Field of Classification Search
CPC ...... H04B 7/0491; H04B 7/10; H04B 7/0617; H01Q 3/30; H01Q 1/246
See application file for complete search history.

(56) References Cited

U.S. PATENT DOCUMENTS

| | | | | |
|---|---|---|---|---|
| 5,977,910 A | * | 11/1999 | Matthews | ............... H01Q 3/26 342/368 |
| 6,571,081 B1 | * | 5/2003 | Reinhardt | .............. H01Q 1/288 455/12.1 |

(Continued)

FOREIGN PATENT DOCUMENTS

WO     2013/087091 A1    6/2013

OTHER PUBLICATIONS

International Search Report and Written Opinion dated Mar. 6, 2017 issued in International Application No. PCT/EP2016/063912. (10 pages).

*Primary Examiner* — Jean B Corrielus
(74) *Attorney, Agent, or Firm* — Rothwell, Figg, Ernst & Manbeck, P.C.

(57) ABSTRACT

It is provided a node in a wireless communication system comprising an analog architecture for achieving vertical sectorization. The node comprises at least four main input/output ports (1, 2, 3, 4), a power splitting stage (5), at least one power redistribution stage (20) and a plurality of pairwise arranged dual polarized antennas (31, 32, 33, 34).

11 Claims, 5 Drawing Sheets

(51) Int. Cl.
*H04B 7/06* (2006.01)
*H01Q 25/00* (2006.01)

(56) References Cited

U.S. PATENT DOCUMENTS

| | | | |
|---|---|---|---|
| 6,642,883 B2 * | 11/2003 | Jacomb-Hood | H01Q 3/2611 |
| | | | 342/354 |
| 2003/0189515 A1 * | 10/2003 | Jacomb-Hood | H01Q 1/288 |
| | | | 342/373 |
| 2012/0068907 A1 | 3/2012 | Petersson et al. | |
| 2014/0203967 A1 * | 7/2014 | Aydin | H01Q 3/267 |
| | | | 342/372 |
| 2014/0347248 A1 * | 11/2014 | Stjernman | H01Q 1/246 |
| | | | 343/893 |
| 2015/0200455 A1 | 7/2015 | Venkateswaran et al. | |
| 2016/0164172 A1 | 6/2016 | Stjernman | |
| 2016/0308279 A1 * | 10/2016 | Athley | H01Q 1/246 |

* cited by examiner

FLEXIBLE ANALOG ARCHITECTURE FOR SECTORIZATION

CROSS REFERENCE TO RELATED APPLICATION(S)

This application is a 35 U.S.C. § 371 National Stage of International Patent Application No. PCT/EP2016/063912, filed Jun. 16, 2016, designating the United States.

TECHNICAL FIELD

The present disclosure relates to a node in a wireless communication system, and in particular to a node comprising an analog architecture for providing sectorization.

BACKGROUND

Future generations of wireless system are expected to provide ubiquitous high data-rate coverage. Achieving this requires an efficient use of the available resources. In light of this, the use of more advanced and adaptive antenna has been given an increased attention. For example, by using multiple antennas at the transmitter and/or the receiver, it is possible to exploit the spatial degrees of freedom offered by the multipath fading inside the wireless channel in order to provide a substantial increase in the data rates and reliability of wireless transmission. Focusing the transmitted energy in certain directions is usually called beamforming.

Cell shaping and UE-specific beamforming are two types of beamforming techniques that significantly can improve performance in cellular networks. Both these techniques can be implemented by using antenna arrays at the base station (BS). Another technique that utilizes the spatial spread of the users and the wireless channel is sectorization. Sectorization is a matter of splitting one cell into two or more, and has traditionally been done by adding hardware, for example replacing one antenna (and RBS) by two new. With the use of advanced antennas, it is however possible to create two sectors (instead of one) from the same antenna. This is typically referred to as sectorization with aperture reuse. One of the major advantages of introducing sectorization in wireless systems is a potential improvement in capacity. More cells allow for more simultaneously scheduled users. Basically, the spatial structure of the channel (and spread of users) is exploited to be able to reuse the resources within a given area.

A conventional way to do sectorization is to divide a site in a number of horizontal sectors, with three sectors being most common. In some high-traffic areas also six horizontal sectors per site are deployed. Another way to increase the sectorization is to split each horizontal sector into two vertical sectors, called vertical sectorization. Recently, there has been a growing interest in vertical sectorization. One problem with vertical sectorization in flat scenarios is that the load balance between the upper and lower cell typically becomes rather uneven. One reason for this is that the user distribution typically is unevenly distributed w.r.t. the elevation angle, where there is typically a large concentration of users just below the horizon. When creating two vertical sectors, the sector that covers the user close to the horizon typically gets much higher traffic load than the other sector, which typically is not optimal for the system performance. One way to mitigate this problem while maintaining high antenna gain to served users is to create one narrow beam that covers the users close to the horizon and one wider beam that covers the other users.

Aperture reused vertical sectorization with the flexibility of changing the beam widths for respective sector beam can typically be done with an active antenna with radio behind each antenna element. One problem with this solution is that it requires many radios (TRXs) which make the product costly to design and manufacture.

SUMMARY

In view of above-mentioned and other drawbacks of the prior art, it is an object of the present invention to provide an improved analog architecture for achieving vertical sectorization.

According to a first aspect, it is provided a node in a wireless communication system comprising at least four main input/output ports, half of the ports being associated with a first polarization and the other half of the ports being associated with a second polarization, a power splitting stage comprising at least four 1+N port power dividers/combiners, one divider/combiner connected to each main input/output port, each power divider/combiner comprising an input/output and N outputs/inputs, N>1, wherein each power divider/combiner output comprises a controllable phase altering device configured to change a phase of a signal received at the power divider/combiner input/output. The node further comprises a first power redistribution stage comprising a plurality of four-port power dividers/combiners, each power divider/combiner having a first port pair and a second port pair, where, for each power divider/combiner, power input into any port in a port pair is isolated from the other port in said port pair, but divided between the ports in the other port pair and a plurality of pairwise arranged dual polarized antennas, each antenna having a first polarization antenna element and a second polarization antenna element, the first polarization and second polarization being mutually orthogonal, such that each antenna comprises a first antenna port, associated with the first polarization antenna element, and a second antenna port, associated with the second polarization antenna element. The plurality of power dividers/combiners are pairwise arranged, each pair comprising a first polarization power divider/combiner and a second polarization power divider/combiner, wherein a first port pair of each power divider/combiner in the first power redistribution stage is communicatively coupled to the main input/output ports of the corresponding polarization, and wherein each pair of power dividers/combiners is connected to an antenna pair such that a second port pair of a first polarization power divider/combiner is connected to first polarization antenna elements of the antennas in the corresponding antenna pair, and a second port pair of a second polarization power divider/combiner is connected to second polarization antenna elements in the antenna pair. Moreover, one port of the second port pair of each power divider/combiner connected to the corresponding antenna element comprises a phase altering device configured to introduce an adjustable phase shift of the port.

Hereby, an analog architecture for vertical sectorization with aperture reuse is provided which does not require using one transceiver (TRX) per antenna. Moreover, by controlling the various phase shifts, beam steering is enabled such that the configuration of the resulting sectors can be controlled. Accordingly, an advantage of the proposed technique is that number of radios needed for flexible vertical sectorization can be reduced, which in turn reduce both the design costs and manufacturing costs of a wireless communication system.

According to some aspects, the node further comprises a second power redistribution stage comprising a plurality of four-port power dividers/combiners arranged between the power splitting stage and the first power redistribution stage, where, for each power divider/combiner, power input into any port in a port pair is isolated from the other port in said port pair, but divided between the ports in the other port pair, wherein a first and second port of a first port pair of each power divider/combiner is connected to a respective first and second power divider/combiner of a respective first and second polarization. A first and second port of a second port pair of the four-port power dividers/combiners is connected to a respective first and second port of a first port pair of a respective power divider/combiner in the first stage. The first port is connected to a power divider/combiner in the first stage belonging to a different pair compared to the power divider/combiner to which the second port is connected and wherein one port of the second port pair of each power divider/combiner in the second stage comprises a controllable phase altering device configured to introduce an adjustable phase shift of the port.

Hereby, vertical sectorization is provided with the possibility to adaptively change both the beam direction and the width/shape for the respective sector beams, i.e. both beam steering and beam forming.

According to some aspects, in the 1+N port power dividers/combiners, N is equal to half of the number of antennas.

Accordingly, the number of ports in the 1+N port power dividers/combiners is increased to accommodate the increased number of antennas. Thereby, the number of antennas can be scaled up, and further control of the sectorization can be provided, without increasing the number of transmitters in the node.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

The present technique is now described, by way of example, with reference to the accompanying drawings, in which.

DETAILED DESCRIPTION

The present technique will now be described more fully hereinafter with reference to the accompanying drawings, in which certain aspects of the invention are shown. This invention may, however, be embodied in many different forms and should not be construed as limited to the embodiments and aspects set forth herein; rather, these embodiments are provided by way of example so that this disclosure will be thorough and complete, and will fully convey the scope of the invention to those skilled in the art. Like numbers refer to like elements throughout the description.

In the following detailed description, various aspects of the node according to the present technique are mainly described with reference to node for use in a communications system.

Figure 1:
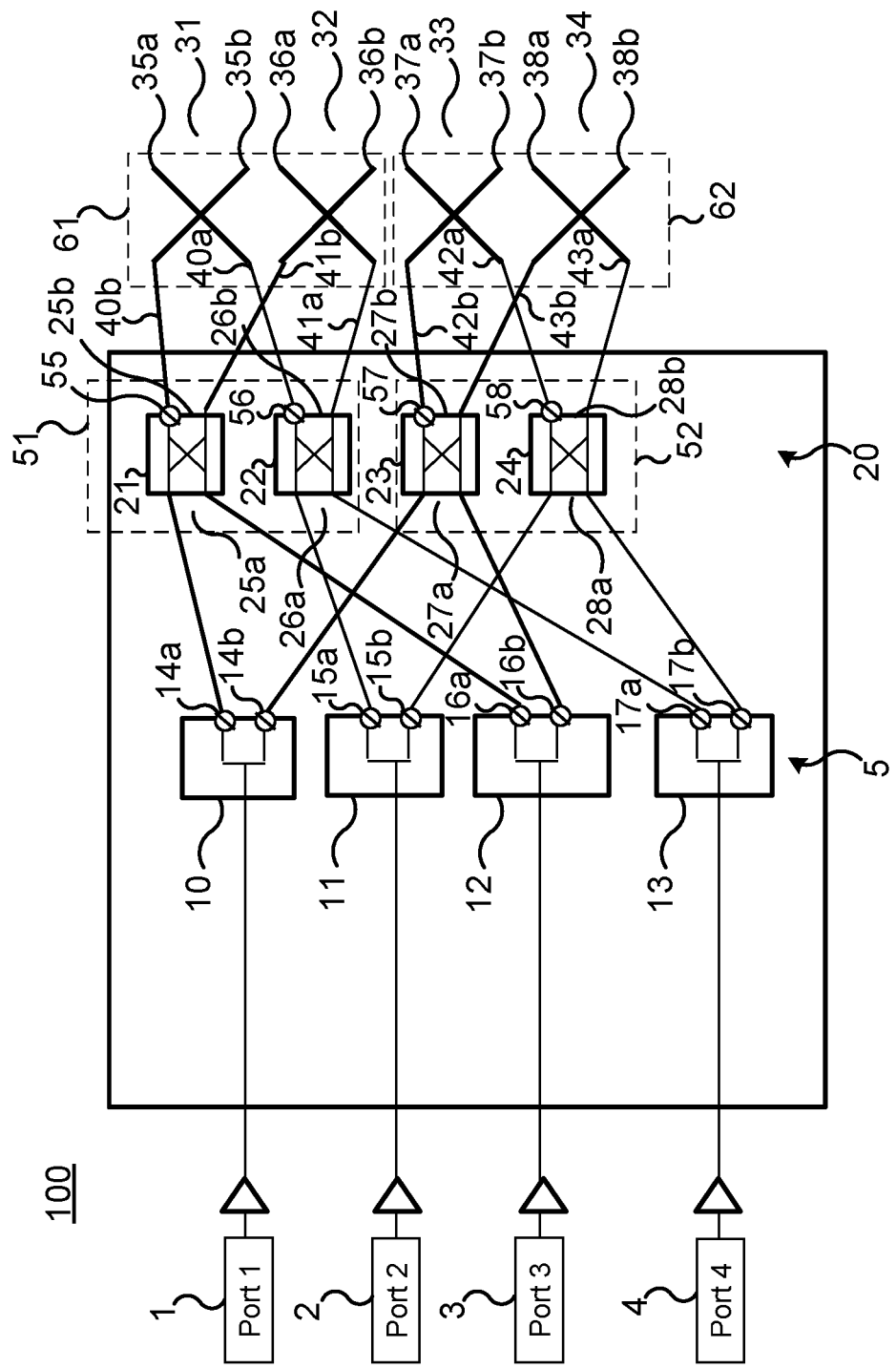
FIG. 1 is a block diagram schematically illustrating a node according to an aspect of the present technique.

FIG. 1 schematically illustrates a node 100 for a wireless communication system comprising at least four main input/output ports 1, 2, 3, 4, half of the ports being associated with a first polarization and the other half of the ports being associated with a second polarization, a power splitting stage 5 comprising at least four 1+N port power dividers/combiners 10, 11, 12, 13, wherein one of the dividers/combiners is connected to each main input/output port 1, 2, 3, 4. Each power divider/combiner 10, 11, 12, 13, comprises an input/output 6, 7, 8, 9 and N outputs/inputs, N>1, wherein each power divider/combiner output comprises a controllable phase altering device 14a-b, 15a-b, 16a-b, 17a-b configured to change a phase of a signal received at the power divider/combiner input/output.

The node further comprises a first power redistribution stage 20 comprising a plurality of four-port power dividers/combiners 21, 22, 23, 24, each power divider/combiner having a first port pair 25a, 26a, 27a, 28a and a second port pair 25b, 26b, 27b, 28b, where, for each power divider/combiner, power input into any port in a port pair is isolated from the other port in the port pair, but divided between the ports in the other port pair.

Additionally, the node comprises a plurality of pairwise arranged dual polarized antennas 31, 32, 33, 34, each antenna having a first polarization antenna element 35b, 36b, 37b, 38b and a second polarization antenna element 35a, 36a, 37a, 38a, the first polarization and second polarization being mutually orthogonal, such that each antenna comprises a first antenna port 40b, 41b, 42b, 42b, associated with the corresponding first polarization antenna element 35b, 36b, 37b, 38b, and a second antenna port 40a, 41a, 42a, 43a, associated with the corresponding second polarization antenna element 35a, 36a, 37a, 38a, wherein the plurality of power dividers/combiners 21, 22, 23, 24 are pairwise arranged, each pair 51, 52 comprising a first polarization power divider/combiner 21, 23 and a second polarization power divider/combiner 22, 24, wherein a first port pair 25a, 26a, 27a, 28a of each power divider/combiner 21, 22, 23, 24 in the first power redistribution stage 20 is communicatively coupled to the main input/output ports 1, 2, 3, 4 of the corresponding polarization.

Each pair of power dividers/combiners 51, 52 is connected to an antenna pair 53, 54 such that a second port pair 25b, 27b of a first polarization power divider/combiner 21, 23 is connected to first polarization antenna elements 35a, 36a, 37a, 38a of the antennas in the corresponding antenna pair, and a second port pair 26b, 28b of a second polarization power divider/combiner 22, 24 is connected to second polarization antenna elements 35b, 36b, 37b, 38b in the antenna pair.

One port of the second port pair of each power divider/combiner 21, 22, 23, 24 connected to the corresponding antenna element comprises a phase altering device 55, 56, 57, 58 configured to introduce an adjustable phase shift of the port.

Figure 2:
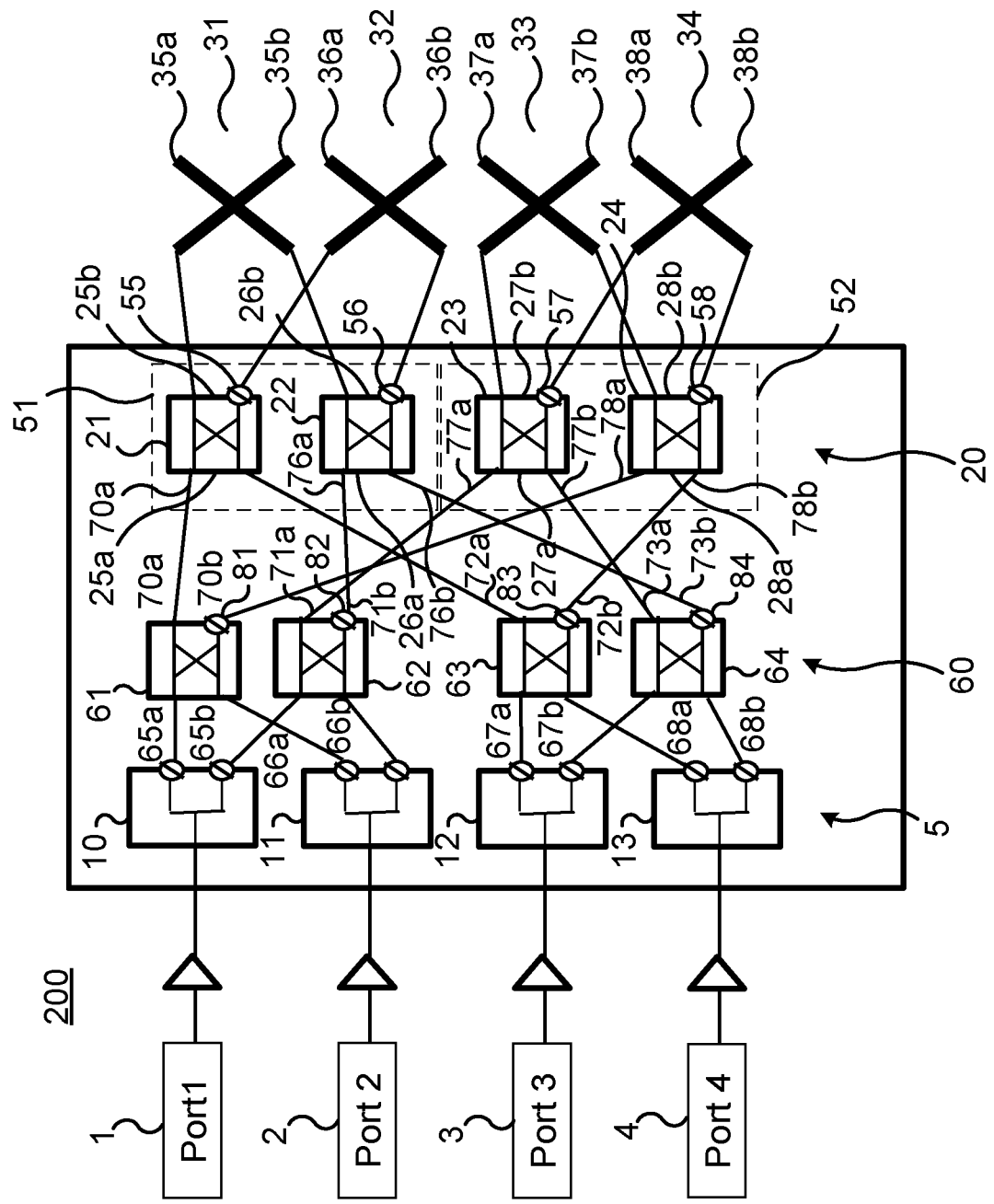
FIG. 2 is a block diagram schematically illustrating a node according to an aspect of the present technique.

FIG. 2 schematically illustrates a node 200 which, in addition to what is described above in reference to FIG. 1, further comprises a second power redistribution stage 60 comprising a plurality of four-port power dividers/combiners 61, 62, 63, 64 arranged between the power splitting stage 5 and the first power redistribution stage 20 illustrated in FIG. 1.

For each power divider/combiner 61, 62, 63, 64, power input into any port in a port pair is isolated from the other port in said port pair, but divided between the ports in the other port pair, wherein a first 65a, 66a, 67a, 68a and second port 65b, 66b, 67b, 68b of a first port pair of each power divider/combiner 61, 62, 63, 64 is connected to a respective first polarization 10, 12 and second polarization 11, 13 1+N port power divider/combiner of a respective first and second polarization, wherein a first 70a, 71 a, 72a, 73a and second 70b, 71 b, 72b, 73b port of a second port pair of the four-port power dividers/combiners 61, 62, 63, 64 is connected to a respective first 75a, 76 a, 77a, 78a and second port 75b, 76b, 77b, 78b of a first port pair of a respective power divider/combiner, 21, 22, 23, 24 in the first stage 20, wherein the first 70a, 71a, 72a, 73a port is connected to a power divider/combiner 21, 22, 23, 24 in the first stage 20 belonging to a different pair 51, 52 compared to the power divider/combiner 21, 22, 23, 24 to which the second 70b, 71 b, 72b, 73b port is connected; and wherein one port of the second port pair of each power divider/combiner 61, 62, 63, 64 in the second stage 60 comprises a controllable phase altering device 81, 82, 83, 84 configured to introduce an adjustable phase shift of the port.

Hereby, the node can be configured such that ports 1 and 2 provides signals to a first sector with pairwise equal power patterns but orthogonal polarizations in every direction and such that ports 3 and 4 provides signals to a first sector with pairwise equal power patterns but orthogonal polarizations in every direction.

The four-port power dividers/combiners of the power distribution stage may also be referred to as hybrids. Furthermore, the 1+N, N=2, port power dividers/combiners 10, 11, 12, 13 are configured to divide the power equally to all four outputs. In the described embodiment, N is equal to half of the number of antennas.

In the above referenced examples, the antenna array is depicted as 4 dual-polarized vertically stacked antennas. By using a number of four-port power dividers/combiners, which may also be referred to as hybrids, and phase altering devices, it is possible to create two sectors with the possibility to adaptively change the beam pointing direction and beam width individually for the respective sector beam.

In order to change the beam width of the sector beams while still maintaining orthogonal polarization between the two beams of respective sector, dual-polarization beamforming has to be used.

Moreover, the phase altering devices 55, 56, 57, 58 are configured to introduce a 90° phase shift of the port.

Furthermore, the controllable phase altering devices 14a-b, 15a-b, 16a-b, 17a-b of the four 1+N-port power dividers/combiners 10, 11, 12, 13 and the controllable phase altering devices 81, 82, 83, 84 of the plurality of 1+N-port power dividers/combiners 61, 62, 63, 64 are configured such that the sum of the phase shifts for all ports of a power divider/combiner 61, 62, 63, 64 is the same for all power dividers/combiners 61, 62, 63, 64 in the third power splitter stage 60.

Thereby, both ports belonging to the same sector provides equal power patterns but with orthogonal polarizations.

In one embodiment, the sum of the phase shifts of all ports of a power divider/combiner 61, 62, 63, 64 is zero.

According to one embodiment, the phase shift of the phase altering devices 14a-b of a first power divider/combiner 10 of the first power splitter stage 5 is the same as the phase shift of the phase altering devices 15a-b of a second power divider/combiner 11 of the first power splitter stage 5, and wherein the phase shift of the phase altering devices 16a-b of a third power divider/combiner 12 of the first power splitter stage 5 is the same as the phase shift of the phase altering devices 17a-b of a fourth power divider/combiner 13 of the first power splitter stage 5.

Hereby, the lobes for the different polarizations in the same sector points in the same direction which enables polarization diversity for all users in each sector.

As can be seen in FIGS. 1 and 2, the illustrated node comprises four main input/output ports, four 1+N port power dividers/combiners 10, 11, 12, 13, N=2, four four-port power dividers/combiners 21, 22, 23, 24; and four pairwise arranged dual polarized antennas 31, 32, 33, 34, where the node of FIG. 2 further comprises four four-port power dividers/combiners 61, 62, 63, 64 in a second power redistribution stage 60.

Figure 3:
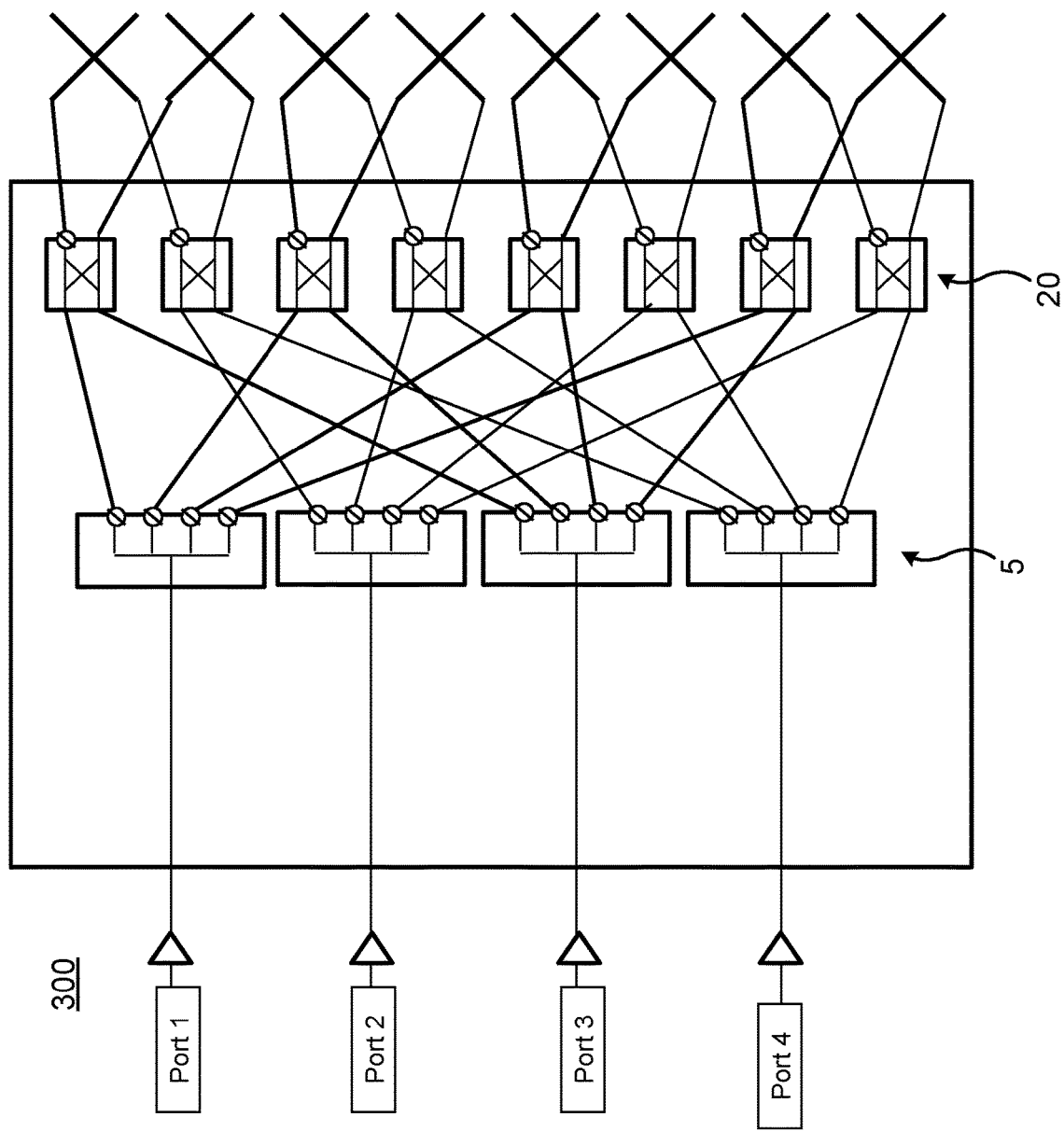
FIG. 3 is a block diagram schematically illustrating a node according to an aspect of the present technique.
Figure 4:
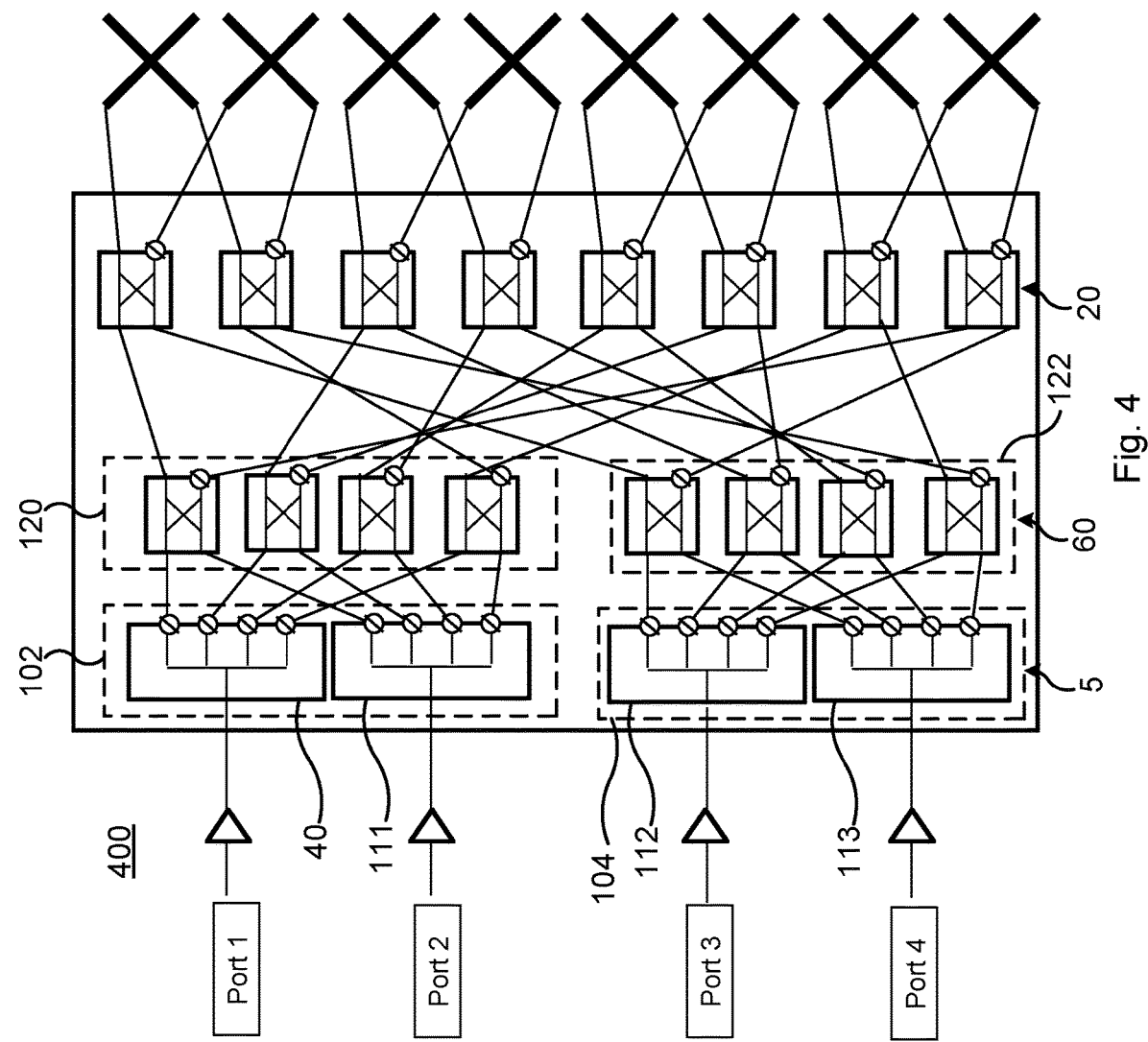
FIG. 4 is a block diagram schematically illustrating a node according to an aspect of the present technique.

In comparison, FIG. 3 illustrates a node 300 comprising four main input/output ports, four 1+N port power dividers/combiners, N=4 in the power splitting stage 5, eight four-port power dividers/combiners in the first power redistribution stage 20 and eight pairwise arranged dual polarized antennas, and in FIG. 4 the node 400 is further comprising eight four-port power dividers/combiners in the second power redistribution stage 60.

An advantageous effect of increasing the number of antennas is that the gain of the antenna increases which typically means that a larger coverage area of the base station can be obtained.

In FIG. 4 there are two groups, 102, 104 each comprising two equal 1+4 port power dividers 110, 111, 112, 113 that divide the power equally to four outputs each. On each output there is an individually controlled phase shifter that controls the phase of each output signal. The outputs of the upper 1+4 port power divider/combiner 110, 112 in each group is connected to the upper input of four port power dividers/combiners arranged in two groups 120, 122 of four power dividers/combiners in each group in the second power redistribution stage 60. It should be noted that not all of the discussed features are given a reference number to avoid cluttering the drawings.

Similarly, the outputs of the lower 1+4 port power dividers/combiners 111, 113 in each group are connected to the lower input of the corresponding four port power dividers/combiners.

Next the upper output of the upper group 120 of four port power dividers/combiners is connected to the upper input of 4 four port power dividers/combiners in a first power redistribution stage 20 and the upper port of the four port power dividers/combiners of the lower group 122 is connected to the lower input of the same 4 four port power dividers/combiners in the same order.

The phase shifter of the lower outputs in the second power redistribution stage 60 are adjusted so that the sum of the phase shifts of all inputs/outputs on each four-port power divider/combiner is zero, then the outputs are connected to another set of four-port power dividers/combiners in the first power redistribution stage, but in reversed order, i.e. the lower output of lowest four-port power divider/combiner in the upper group 120 is connected to the upper input of the uppermost four-port power divider/combiner and the lower output of the lowest four-port power divider/combiner of the lower group 122 is connected to the lower input of the uppermost four-port power divider/combiner.

The upper port of each four-port power divider/combiner in the first power redistribution stage 20 is connected directly to the upper antenna element of a pair of adjacent co/cross-polarized elements and the lower output has an adjustable phase shifter and is connected the lower element. The phase shift controls where the orthogonal element patterns of the inputs to the right most signal redistribution overlap.

The signal transfer matrix from input ports to antenna element ports is given by $$\frac{1}{4} \begin{bmatrix} e^{j\frac{3}{2}\Delta 1} & je^{j\frac{3}{2}\Delta 2} & je^{j\frac{3}{2}\Delta 3} & -e^{j\frac{3}{2}\Delta 4} \\ je^{j\frac{3}{2}\Delta 1}e^{j\Delta H} & e^{j\frac{3}{2}\Delta 2}e^{j\Delta H} & e^{j\frac{3}{2}\Delta 3}e^{j\Delta H} & je^{j\frac{3}{2}\Delta 4}e^{j\Delta H} \\ e^{j\frac{1}{2}\Delta 1} & je^{j\frac{1}{2}\Delta 2} & je^{j\frac{1}{2}\Delta 3} & -e^{j\frac{1}{2}\Delta 4} \\ je^{j\frac{1}{2}\Delta 1}e^{j\Delta H} & e^{j\frac{1}{2}\Delta 2}e^{j\Delta H} & e^{j\frac{1}{2}\Delta 3}e^{j\Delta H} & je^{j\frac{1}{2}\Delta 4}e^{j\Delta H} \\ e^{-j\frac{1}{2}\Delta 1} & je^{-j\frac{1}{2}\Delta 2} & je^{-j\frac{1}{2}\Delta 3} & -e^{-j\frac{1}{2}\Delta 4} \\ je^{-j\frac{1}{2}\Delta 1}e^{j\Delta H} & e^{-j\frac{1}{2}\Delta 2}e^{j\Delta H} & e^{-j\frac{1}{2}\Delta 3}e^{j\Delta H} & je^{-j\frac{1}{2}\Delta 4}e^{j\Delta H} \\ e^{-j\frac{3}{2}\Delta 1} & je^{-j\frac{3}{2}\Delta 2} & je^{-j\frac{3}{2}\Delta 3} & -e^{-j\frac{3}{2}\Delta 4} \\ je^{-j\frac{3}{2}\Delta 1}e^{j\Delta H} & e^{-j\frac{3}{2}\Delta 2}e^{j\Delta H} & e^{-j\frac{3}{2}\Delta 3}e^{j\Delta H} & je^{-j\frac{3}{2}\Delta 4}e^{j\Delta H} \\ je^{j\frac{3}{2}\Delta 2} & e^{j\frac{3}{2}\Delta 1} & -e^{j\frac{3}{2}\Delta 4} & je^{j\frac{3}{2}\Delta 3} \\ -e^{j\frac{3}{2}\Delta 2}e^{j\Delta H} & je^{j\frac{3}{2}\Delta 1}e^{j\Delta H} & je^{j\frac{3}{2}\Delta 4}e^{j\Delta H} & e^{j\frac{3}{2}\Delta 3}e^{j\Delta H} \\ je^{j\frac{1}{2}\Delta 2} & e^{j\frac{1}{2}\Delta 1} & -e^{j\frac{1}{2}\Delta 4} & je^{j\frac{1}{2}\Delta 3} \\ -e^{j\frac{1}{2}\Delta 2}e^{j\Delta H} & je^{j\frac{1}{2}\Delta 1}e^{j\Delta H} & je^{j\frac{1}{2}\Delta 4}e^{j\Delta H} & e^{j\frac{1}{2}\Delta 3}e^{j\Delta H} \\ je^{-j\frac{1}{2}\Delta 2} & e^{-j\frac{1}{2}\Delta 1} & -e^{-j\frac{1}{2}\Delta 4} & je^{-j\frac{1}{2}\Delta 3} \\ -e^{-j\frac{1}{2}\Delta 2}e^{j\Delta H} & je^{-j\frac{1}{2}\Delta 1}e^{j\Delta H} & je^{-j\frac{1}{2}\Delta 4}e^{j\Delta H} & e^{-j\frac{1}{2}\Delta 3}e^{j\Delta H} \\ je^{-j\frac{3}{2}\Delta 2} & e^{-j\frac{3}{2}\Delta 1} & -e^{-j\frac{3}{2}\Delta 4} & je^{-j\frac{3}{2}\Delta 3} \\ -e^{-j\frac{3}{2}\Delta 2}e^{j\Delta H} & je^{-j\frac{3}{2}\Delta 1}e^{j\Delta H} & je^{-j\frac{3}{2}\Delta 4}e^{j\Delta H} & e^{-j\frac{3}{2}\Delta 3}e^{j\Delta H} \end{bmatrix}$$

Where the first 8 rows are for the first polarization and the other 8 rows are for the second polarization. Δ1 denotes the phase difference between output ports of the 1+N port power dividers/combiners in the power splitting stage 5 for port 1 and similarly for Δ2, Δ3 and Δ4. ΔH is the phase setting on the four-port power dividers/combiners of the first power redistribution stage 20. The phase settings on the phase shifters on the four-port power dividers/combiners of the second power redistribution stage 60 are included in the matrix and are given by the phase settings Δ1, Δ2, Δ3, and Δ4.

Figure 5:
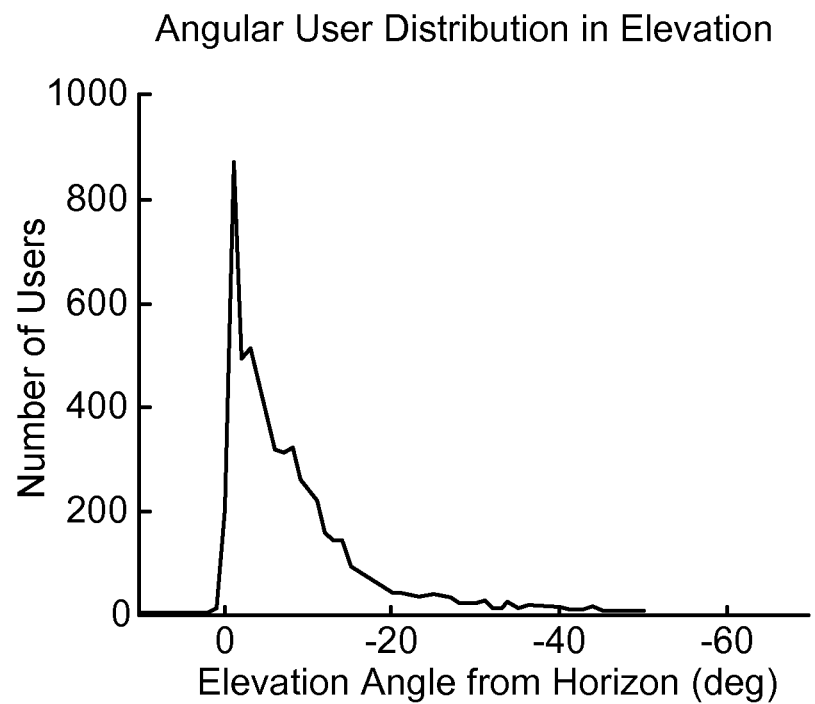
FIG. 5 schematically illustrates an example of angular user distribution.

FIG. 5 schematically illustrates angular user distribution in elevation of served users in an urban flat scenario, illustrating the need for vertical sectorization with different beam widths in order to get an even traffic load distribution between the two sectors.

Figure 6:
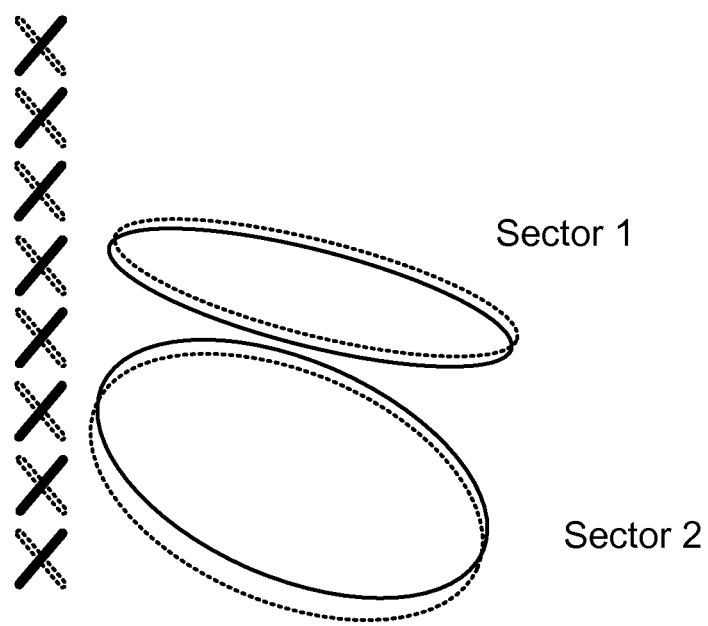
FIG. 6 schematically illustrates vertical sectorization.

FIG. 6 is an illustrative example of vertical sectorization where the upper sector beam of Sector 1 is narrow and the lower sector beam of Sector 2 is wider in order to better balance the load between the two sectors.

The embodiments herein are shown as comprising four and eight 8 element antenna arrays but could be realized in the same way for any even number of elements in the array.

Moreover, the terms lobe and beam both relate to the antenna radiation characteristics. Furthermore, when terms like orthogonal are used, they are not to be interpreted as mathematically exact, but within what is practically obtainable. Additionally, the polarizations may have any directions, but should always be orthogonal.

Even though the invention has been described with reference to specific exemplifying embodiments thereof, many different alterations, modifications and the like will become apparent for those skilled in the art from a study of the drawings, the disclosure, and the appended claims. Also, it should be noted that parts of the connector arrangement may be omitted, interchanged or arranged in various ways, the connector arrangement yet being able to perform the functionality of the present invention. The mere fact that certain measures are recited in mutually different dependent claims does not indicate that a combination of these measured cannot be used to advantage. Additionally, variations to the disclosed embodiments can be understood and effected by the skilled person in practicing the claimed invention. In the claims, the word "comprising" does not exclude other elements or steps, and the indefinite article "a" or "an" does not exclude a plurality.

The invention claimed is:

1. A node for a wireless communication system comprising:
   at least four main input/output ports, half of the ports being associated with a first polarization and the other half of the ports being associated with a second polarization;
   a power splitting stage comprising at least four 1+N port power dividers/combiners, one divider/combiner connected to each main input/output port, each power divider/combiner comprising an input/output and N outputs/inputs, N>1, wherein each power divider/combiner output comprises a controllable phase shifter configured to change a phase of a signal received at the power divider/combiner input/output;
   a first power redistribution stage comprising a plurality of four-port power dividers/combiners, each power divider/combiner in the first power redistribution stage having a first port pair and a second port pair, where, for each power divider/combiner in the first power redistribution stage, power input into any port in a port pair is isolated from the other port in said port pair, but divided between the ports in the other port pair;
   a plurality of pairwise arranged dual polarized antennas, each antenna having a first polarization antenna element and a second polarization antenna element, the first polarization and second polarization being mutually orthogonal, such that each antenna comprises a first antenna port, associated with the corresponding first polarization antenna element, and a second antenna port, associated with the corresponding second polarization antenna element, wherein
   the plurality of power dividers/combiners are pairwise arranged, each pair comprising a first polarization power divider/combiner and a second polarization power divider/combiner,
   a first port pair of each power divider/combiner in the first power redistribution stage is communicatively coupled to the main input/output ports of the corresponding polarization,
   each pair of power dividers/combiners is connected to an antenna pair such that a second port pair of a first polarization power divider/combiner is connected to first polarization antenna elements of the antennas in the corresponding antenna pair, and a second port pair of a second polarization power divider/combiner is connected to second polarization antenna elements in the antenna pair, and one port of the second port pair of each power divider/combiner in the first power redistribution stage comprises a phase shifter configured to shift a phase of i) a signal output from the one port of the second port pair or ii) a signal input to the one port of the second port pair.

2. The node of claim 1, further comprising a second power redistribution stage comprising a plurality of four-port power dividers/combiners arranged between the power splitting stage and the first power redistribution stage, where, for each power divider/combiner, power input into any port in a port pair is isolated from the other port in said port pair, but divided between the ports in the other port pair, wherein a first and second port of a first port pair of each power divider/combiner is connected to a respective first polarization and second polarization 1+N port power divider/combiner of a respective first and second polarization;

wherein a first and second port of a second port pair of the plurality of four-port power dividers/combiners is connected to a respective first and second port of a first port pair of a respective power divider/combiner in the first power redistribution stage, wherein the first port is connected to a power divider/combiner in the first power redistribution stage belonging to a different pair compared to the power divider/combiner to which the second port is connected; and wherein one port of the second port pair of each power divider/combiner in the second stage comprises a controllable phase shifter configured to introduce an adjustable phase shift of the port.

3. The node of claim 1, wherein the phase shifters are configured to introduce a 90° phase shift.

4. The node of claim 2, wherein the controllable phase shifters of the four 1+N-port power dividers/combiners and the controllable phase shifters of the plurality of 1+N-port power dividers/combiners are configured such that the sum of the phase shifts for all ports of a power divider/combiner is the same for all power dividers/combiners in the third power splitter stage.

5. The node of claim 4, wherein the sum of the phase shifts of all ports of a power divider/combiner is zero.

6. The node of claim 1, wherein the phase shift of the phase shifters of a first power divider/combiner of the first power splitter stage is the same as the phase shift of the phase shifters of a second power divider/combiner of the first power splitter stage, and wherein the phase shift of the phase shifters of a third power divider/combiner of the first power splitter stage is the same as the phase shift of the phase shifters of a fourth power divider/combiner of the first power splitter stage.

7. The node of claim 1, wherein N is equal to half of the number of antennas.

8. The node of claim 1, comprising:

four main input/output ports;

four 1+N port power dividers/combiners, N=2;

four four-port power dividers/combiners; and four pairwise arranged dual polarized antennas.

9. The node of claim 8, further comprising four four-port power dividers/combiners in a second power redistribution stage.

10. The node of claim 1, comprising:

four main input/output ports;

four 1+N port power dividers/combiners, N=4 in the power splitting stage;

eight four-port power dividers/combiners in the first power redistribution stage; and eight pairwise arranged dual polarized antennas.

11. The node of claim 10, comprising eight four-port power dividers/combiners in a second power redistribution stage.

* * * * *